United States Patent [19]
Elsing et al.

[11] Patent Number: 5,376,850
[45] Date of Patent: Dec. 27, 1994

[54] AUDIBLE NOISE REDUCTION IN A DISC DRIVE

[75] Inventors: John W. Elsing, Edina; William C. Bright, Lakeville, both of Minn.

[73] Assignee: Seagate Technology, Inc., Scotts Valley, Calif.

[21] Appl. No.: 86,791

[22] Filed: Jul. 2, 1993

[51] Int. Cl.$^5$ .......................... H02K 7/14; H02K 5/24; H02K 1/06; G11B 17/08
[52] U.S. Cl. .................................. 310/67 R; 310/51; 310/217; 360/98.07
[58] Field of Search .................... 310/43, 51, 67 R, 91, 310/217; 360/98.07, 99.04, 99.08

[56] References Cited

U.S. PATENT DOCUMENTS

| | | | |
|---|---|---|---|
| 1,668,891 | 10/1928 | Spreen | 310/51 |
| 3,483,407 | 12/1969 | Frohmüller et al. | 310/51 |
| 3,546,504 | 12/1970 | Janssen et al. | 310/51 |
| 4,647,803 | 3/1987 | von der Heide et al. | 310/51 |
| 4,672,250 | 6/1987 | Seitz | 310/67 R |
| 4,760,299 | 7/1988 | Dickie et al. | 310/51 |
| 4,823,034 | 4/1989 | Wrobel | 310/67 R |
| 5,079,466 | 1/1992 | Jones | 310/43 |
| 5,227,686 | 7/1993 | Ogawa | 360/99.08 |
| 5,235,227 | 8/1993 | Fazekas | 310/51 |
| 5,241,229 | 8/1993 | Katakura et al. | 310/51 |

FOREIGN PATENT DOCUMENTS

| | | | |
|---|---|---|---|
| 770273 | 10/1967 | Canada | 310/51 |
| 0089838 | 4/1991 | Japan | 310/51 |
| 404168942 | 6/1992 | Japan | 310/51 |
| 404251542 | 9/1992 | Japan | 310/51 |
| 4364340 | 12/1992 | Japan | 310/51 |
| 2154072 | 8/1985 | United Kingdom | 310/51 |

*Primary Examiner*—Kristine L. Peckman
*Assistant Examiner*—Clayton E. LaBalle
*Attorney, Agent, or Firm*—Edward P. Heller, III

[57] ABSTRACT

A spindle motor for a disc drive data storage device in which the stator is isolated from the stationary portion of the motor used to attach the spindle motor to the disc drive housing by use of resilient members interposed between the stator and the stationary portion of the motor. In a preferred embodiment, the resilient members comprise a plurality of toroidal rings, or O-rings, and, in a first aspect of the invention, these rings are interposed radially between the stator and the stationary portion of the spindle motor and are axially constrained in relationship to the motor by a corresponding number of annular grooves formed in the stationary portion of the motor. In a second aspect of the invention, metal-to-metal contact between the stator and the stationary portion of the motor in the axial direction is eliminated through the use of a non-metallic washer at one end of the stator and an axial O-ring at the other end of the stator. Circumferential movement of the stator relative to the stationary portion of the motor is prevented by the use of a stator lock ring.

3 Claims, 6 Drawing Sheets

AUDIBLE NOISE REDUCTION IN A DISC DRIVE

BACKGROUND OF THE INVENTION

1. Field of the Invention

This invention relates generally to the field of rigid disc drive data storage devices, and more particularly, but not by way of limitation, to a method and apparatus for reducing the generation of acoustic noise in a disc drive data storage device.

2. Brief Description of the Prior Art

Disc drive data storage devices of the type known as "Winchester" disc drives are well known in the industry. In such machines, digital data are recorded on and retrieved from a thin layer of magnetizable material on the surface of spinning discs. The recording and retrieval of data—also referred to as "writing" and "reading", respectively—is accomplished using a transducer carried in a slider body which includes a self-acting hydrodynamic air bearing which "flies" the transducer a very small distance above the surface of the disc. This slider/transducer subassembly is sometimes referred to collectively as a head, and typically a single head is associated with each disc surface. The heads are selectively moved, under control of electronic circuitry, to any one of a plurality of circular, concentric data tracks on the disc surface by an actuator device. In the current generation of rigid disc drive products, the most commonly used type of actuator is the rotary moving coil actuator. The discs themselves are typically mounted in a "stack" on the hub structure of a brushless DC spindle motor, and the rotational speed of the spindle motor is precisely controlled by motor drive circuitry which controls both the timing and power of commutation signals directed to the stator windings of the motor.

The first Winchester disc drives to be produced were large cabinet models which included discs having a diameter of fourteen inches and AC induction spindle motors. These types of disc drive were commonly located in dedicated "computer rooms" with large main frame types of computers, where such environmental factors as temperature and humidity could be carefully controlled. In this type of environment, the acoustic noise generated by cooling fans and disc drive motors was of little concern, since the only persons directly in contact with the systems were maintenance and operations personnel, who were generally not in the computer room for extended periods of time. The users of such systems were typically located at a remote location and communicated with the computer system via keyboards and display terminals which did not generate excessive amounts of acoustic noise.

With the advent of the personal computer, however, it is most common for a computer system to be located within the work space of the system user, which has prompted increased awareness on the part of system manufacturers of the problem of acoustic noise. Indeed, in certain markets, such as Europe, the amount of acoustic noise allowable in the work place is closely regulated and controlled. With this in mind, it has become commonplace for system manufacturers to impose a "noise budget" on manufacturers of major system components, such as disc drives, which limits the amount of acoustic noise that such components can contribute to the over-all noise of the system.

One of the principal sources of acoustic noise in disc drive data storage devices is the spindle motor which mounts the discs and spins them at a constant high speed. Typical spindle motor speeds have been in the range of 3600 RPM and in products of the current technology have increased to 4800 RPM, 7200 RPM and beyond. Analysis of various types of disc drives have brought to light several different modes of acoustic noise generation which are attributable to the spindle motor and its control logic.

An analysis of acoustic noise in one disc drive product revealed that the mode of noise generation was sympathetic vibration of the disc drive housing in response to the rotating mass of the spindle motor. When the motor was spinning at its intended 3600 RPM operational speed, the housing adjacent the spindle motor shaft vibrated at 960 Hz. In this product, the spindle motor stator was rigidly mounted to a ball bearing housing, which, in turn, was rigidly attached to the disc drive housing.

In another disc drive—with a spindle motor operating at 7200 RPM—it was found that a major mode of acoustic noise generation was the excitation of the stator mass by the application and removal of the commutation pulses used to drive the motor and control its speed. The vibration of the stator was rigidly coupled to the housing to induce an unacceptable amount of acoustic noise at a frequency of 5760 Hz. This product utilized a stationary-shaft spindle motor, and the stator was rigidly attached to the stationary shaft, which was in turn fixedly attached to the disc drive housing. The commutation pulses are timed, polarization-selected DC current pulses which are directed to sequentially selected stator windings. The rapid rise and fall times of these pulses act as a striking force, much like the contact of a hammer blow, and set up sympathetic vibrations in the stator structure. Since the stator in this motor was rigidly connected through the stationary shaft to the disc drive housing, these vibrations were close-coupled to the housing and generated resonant vibrations in the housing which were the source of unacceptable acoustic noise.

Prior art attempts to reduce or eliminate this noise have generally been confined to controlling the resonant frequency of the housing, and, in some cases, damping the vibration of the housing.

The general intent of the present invention is to uncouple the stator of the spindle motor from hard contact with the housing of the disc drive brought about by rigid attachment of the stator to the stationary portion of the motor, and thus minimize the acoustic noise caused by these modes of noise generation.

It has been found that a single inventive improvement in spindle motor design was capable of alleviating both of these situations, and it is this invention which will be discussed below.

SUMMARY OF THE INVENTION

A spindle motor for a disc drive data storage device is disclosed in which the stator of the spindle motor is isolated from the stationary portion of the motor which is in turn rigidly attached to the housing of the disc drive, thus reducing or minimizing acoustic noise. This is accomplished by interposing a plurality of resilient toroidal rings, or O-rings, between the stator structure and the stationary portion of the motor used to attach the motor to the disc drive housing. In a first aspect of the invention, the resilient rings are interposed radially between the stator and the stationary portion of the motor, and in a second aspect of the invention, a non-metallic washer and an axial O-ring are used to axially constrain the stator relative to the stationary portion of the motor without direct metal-to-metal contact between the stator and the stationary portion of the motor. In the embodiment shown, a stator lock ring is disclosed which prevents circumferential movement of the stator relative to the stationary portion of the motor.

It is an object of the invention to provide a spindle motor which reduces or minimizes acoustic noise caused by the coupling of the spindle motor of a disc drive data storage device to the housing of the disc drive.

It is another object of the invention to provide a spindle motor which reduces acoustic noise without impacting performance in the areas of, e.g., spindle performance, operation over specified temperature range, servo system response at various frequencies, shock and vibration, etc.

It is another object of the invention to provide a spindle motor which eliminates the mess associated with the use of epoxy to mount the spindle motor stator, and eliminates the necessity of curing epoxy from the spindle motor manufacturing process.

It is yet another object of the invention to provide a spindle motor in which the stator and mounting components of the motor can be readily disassembled should either prove faulty during the manufacturing process, allowing acceptable parts to be reused, thus reducing scrap and lowering costs.

These and other objects, features and benefits of the present invention can be best understood when the following detailed description of the invention is read in conjunction with the accompanying drawings.

DETAILED DESCRIPTION OF THE INVENTION

Figure 1:
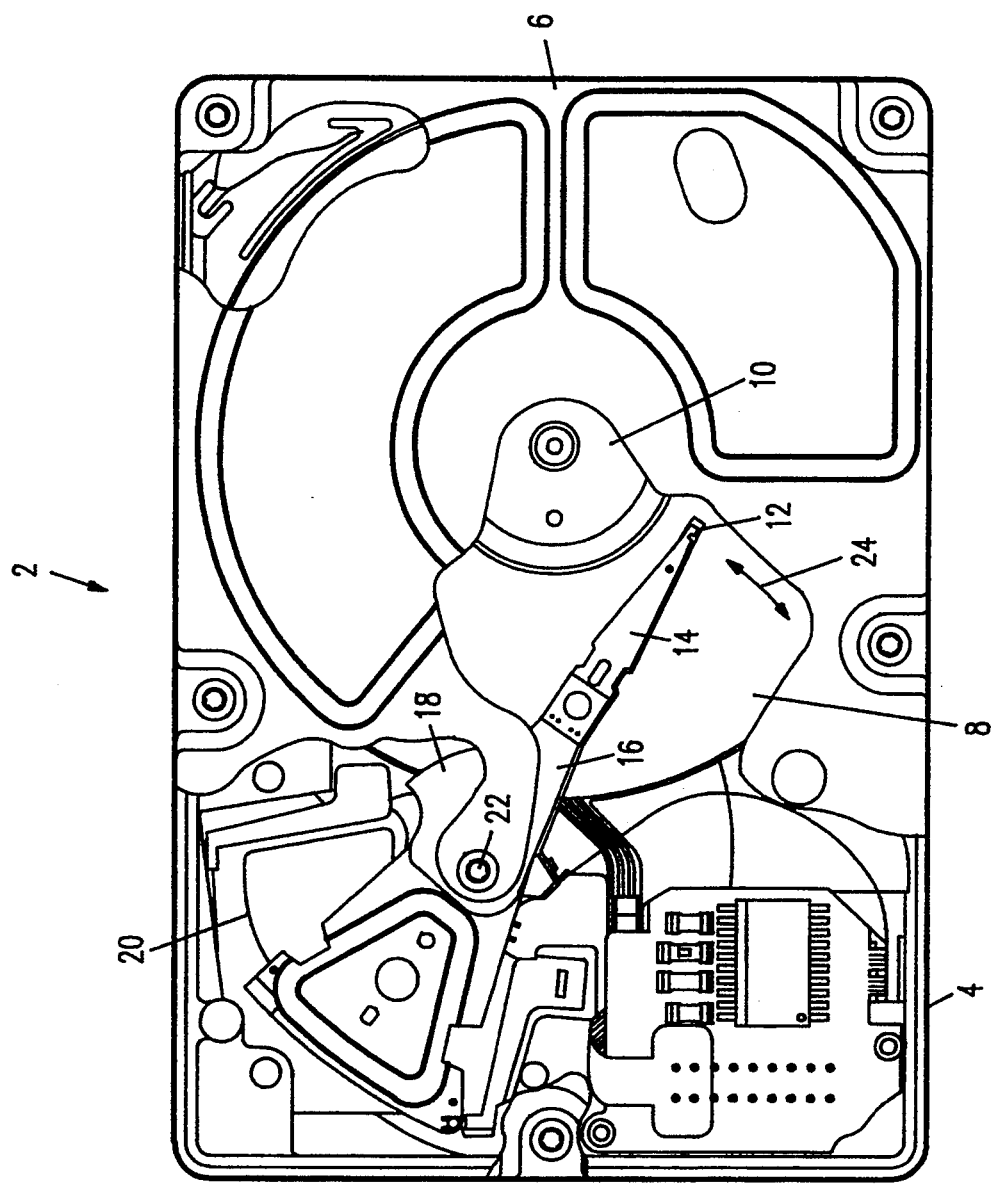
FIG. 1 is a plan view of a typical disc drive, showing the relationship between the major components.

Turning now to the drawings and in particular to FIG. 1, shown is a disc drive 2 of the type in which the present invention is particularly useful. The disc drive 2 includes a housing base member 4 to which the remainder of the disc drive components are either directly or indirectly mounted. This housing base member 4 combines with a top cover 6 to form a sealed environment to protect the delicate internal components from contamination by elements from outside the sealed environment. A plurality of discs 8 is mounted for rotation on a spindle motor (not shown) by a disc clamp 10, and each disc surface has a head 12 mounted for cooperative engagement. In the example disc drive shown in the figure, the heads 12 are supported by flexures 14 which are in turn attached to the head mounting arms 16 of an actuator body 18. The actuator shown is of the type known as a rotary moving coil actuator and includes a voice coil motor (VCM), shown generally at 20, for rotating the actuator body 18 with its attached heads 12 about a pivot shaft 22. This rotary motion of the VCM 20 causes the heads to be controllably moved to desired track locations along arcuate path 24. It should be noted that, while this sort of "base member/top cover" housing is most common in the industry, other arrangements of the housing components have been frequently used, and the present invention should in no way be thought to be limited by the configuration of the disc drive housing. For instance, disc drives have been manufactured using a vertical split between two housing members. In such drives, that portion of the housing half which connects to the lower end of the spindle motor is analogous to the base member 4, while the opposite side of the same housing member, which is connected to or adjacent the top of the spindle motor, is functionally the same as the top cover 6. Throughout this discussion, the use of the terms base member 4 and top cover 6 will be used, even though these functional units may be parts of the same physical piece part.

Figure 2:
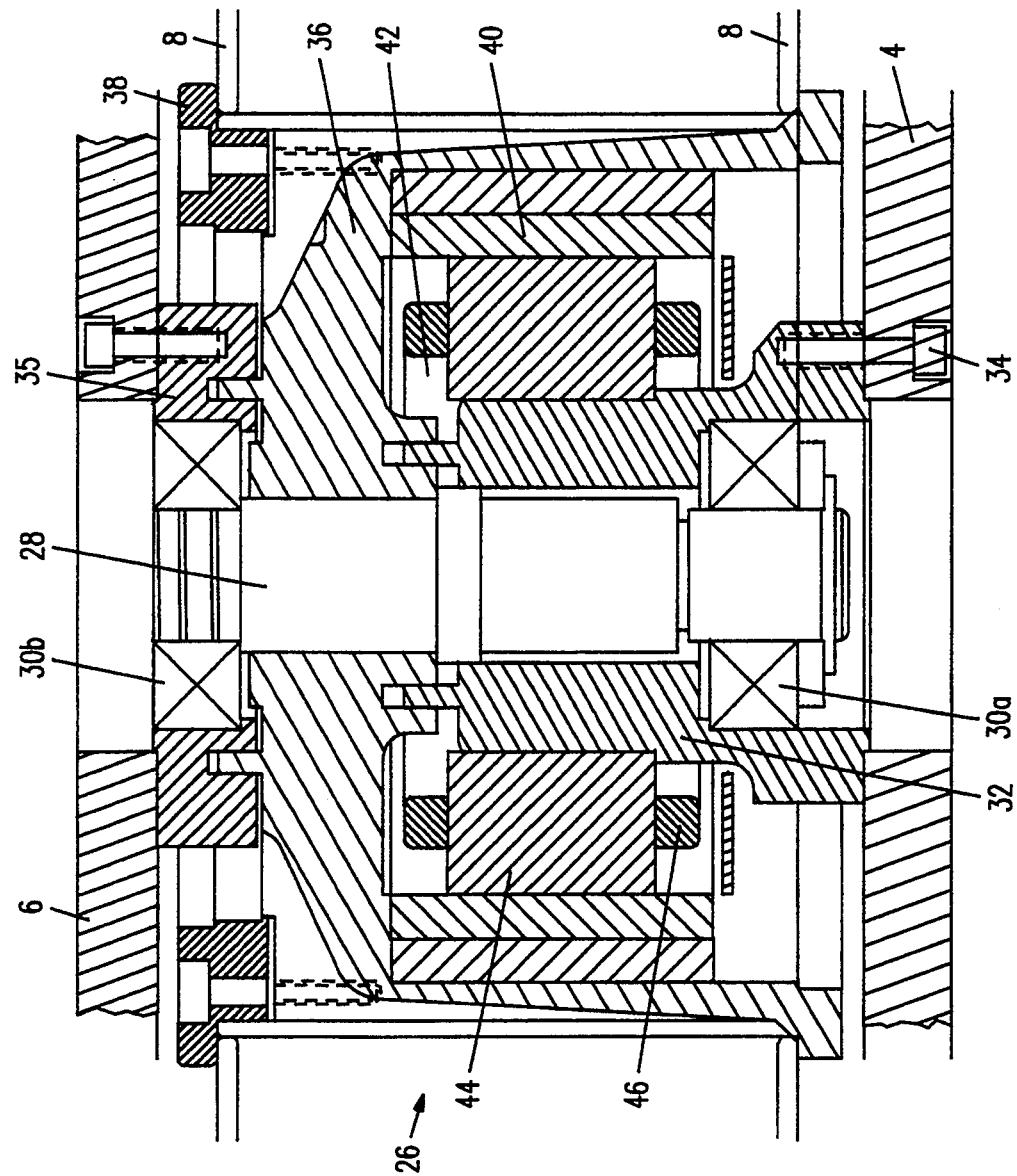
FIG. 2 is a sectional view of a prior art spindle motor.

Turning now to FIG. 2, shown is a sectional view of a spindle motor 26 of a type common in the prior art. The spindle motor 26 includes a shaft 28 which is supported by a pair of ball bearings 30a, 30b. The outer race of the lower ball bearing 30a is press-fitted, or adhesively bonded, to a lower bearing/stator mount, hereinafter referred to as an attachment member 32, which serves to mount the motor 26 to the housing base member 4 of the disc drive with a plurality of screws 34, or equivalent fasteners. The outer race of the upper ball bearing 30b is fixedly mounted in an upper bearing holder 35, which is fastened by screws (not designated) to the top cover 6 of the housing of the disc drive. In an actual disc drive employing this type of motor, the housing was of the type described above having a vertical split between the housing elements and the top and bottom of the motor were both fastened to opposing portions of the same housing deck element. The practice of constraining both the top and bottom of the spindle motor of the disc drive has become common in the industry—particularly in disc drives with large numbers of discs—to provide a more stable assembly.

The shaft 28 is also directly attached to a hub 36, which supports a plurality of discs 8. Individual discs 8 are separated by spacers (not shown) and held on the hub 36 by a disc clamp 38. On the inner surface of the hub 36 is a permanent magnet 40 which acts as the rotor of the motor 26.

The stator 42 of the motor 26 is made up of a stack of stator laminations 44 and associated stator windings 46. The stator 42 is rigidly attached to the attachment member 32, typically with epoxy, or a similar adhesive. It is this hard-coupling of the stator 42 through the attachment member 32 to the disc drive housing that brings about the generation of acoustic noise as was discussed above.

Figure 3:
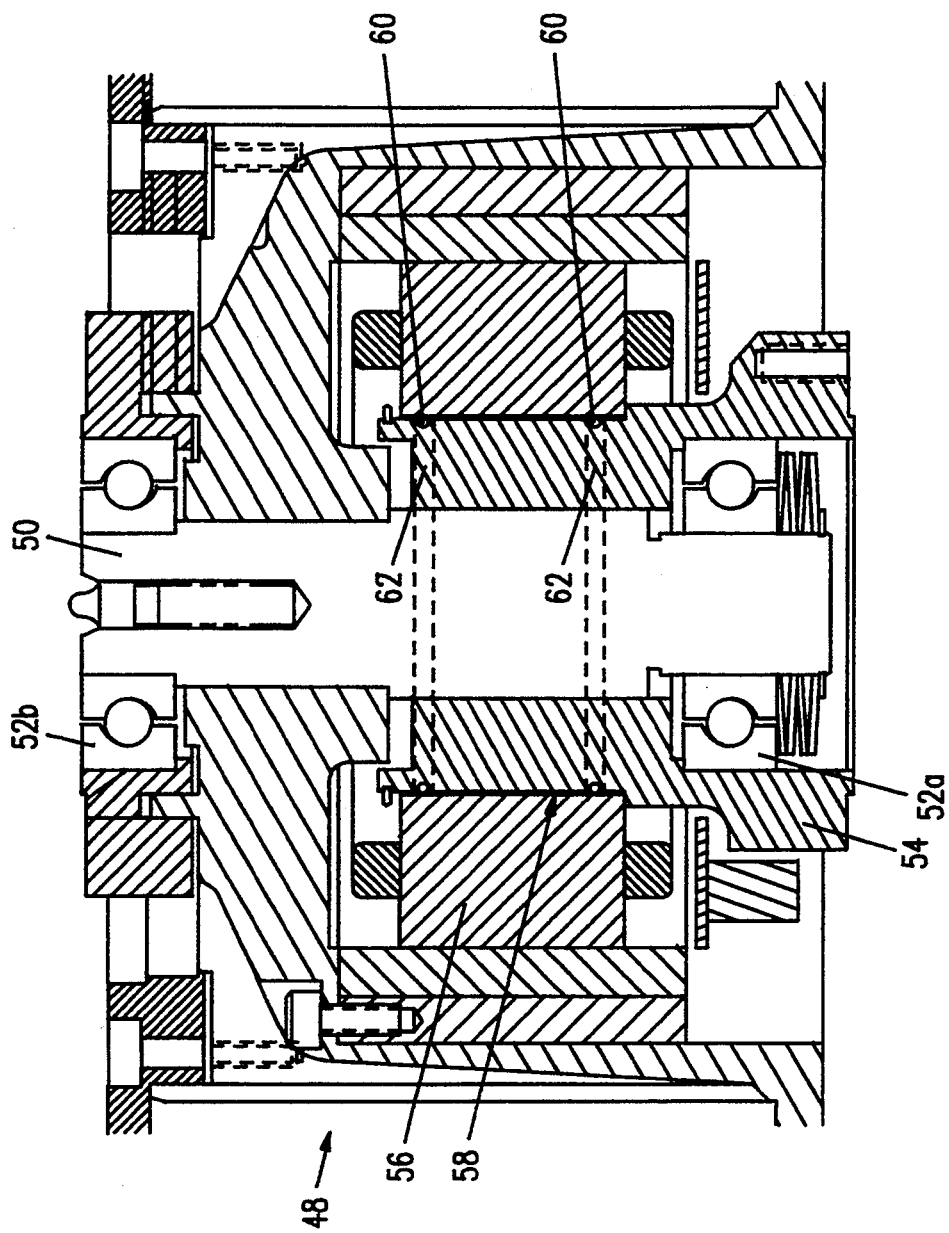
FIG. 3 is a sectional view of a first embodiment of the present invention.

FIG. 3 shows a spindle motor 48 made in accordance with the present invention. This particular motor configuration has been used to cure an acoustic noise problem in an eight-inch disc drive in which the 3600 RPM spindle motor rotation caused an unacceptable amount of acoustic noise at 960 Hz. It can be seen that the structure of this motor 48 is very similar to that of the motor discussed above in regard to FIG. 2, i.e., the shaft 50 of the motor is supported by ball bearings 52a, 52b at both ends, and the outer race of the lower ball bearing 52a is carried in an attachment member 54 which is used to rigidly mount the motor 48 to the disc drive housing (not shown). The principal difference between this motor 48 and the prior art motor discussed above lies in the mechanism used to attach the stator 56 to the attachment member 54. It will be recalled that in the prior art motor the stator was "hard connected" to the attachment member using epoxy or a similar adhesive. In the motor 48 of FIG. 3, an air gap 58 exists between the stator 56 and the attachment member 54, and contact between these two components is made through a pair of resilient toroidal members, or O-rings 60, which are axially constrained by annular grooves 62 formed in the outer surface of the attachment member 54. It has been found that this type of structure is capable of supplying the "stiffness" necessary to maintain the proper relationship between the stator 56 and other motor components if the O-rings are formed from 70 durometer material, such as Viton ®, a patented polymer product of E. I. Dupont de Nemours Co., of Wilmington, Del., and subjected to 0.009 inches of radial compression. This arrangement of components causes an apparent mass change in the entire system, allowing it to become inert to the 3600 RPM exciting frequency and thus eliminating the 960 Hz acoustic noise from the vibrating housing.

In practice it has been found that the motor structure of the present invention does not mask out noise caused by a faulty bearing, thus still allowing such defective parts to be recognized by the noise they generate.

Manufacturing advantages brought about by the motor structure of the present invention include the elimination of the mess of using epoxy to bond the stator to the attachment member, as well as the elimination of the process time which must be allocated for curing epoxy. A further advantage is the capability of disassembling the stator from the attachment member should either of these parts prove to be faulty after assembly, and the ability to re-use any good parts after such disassembly.

Figure 4:
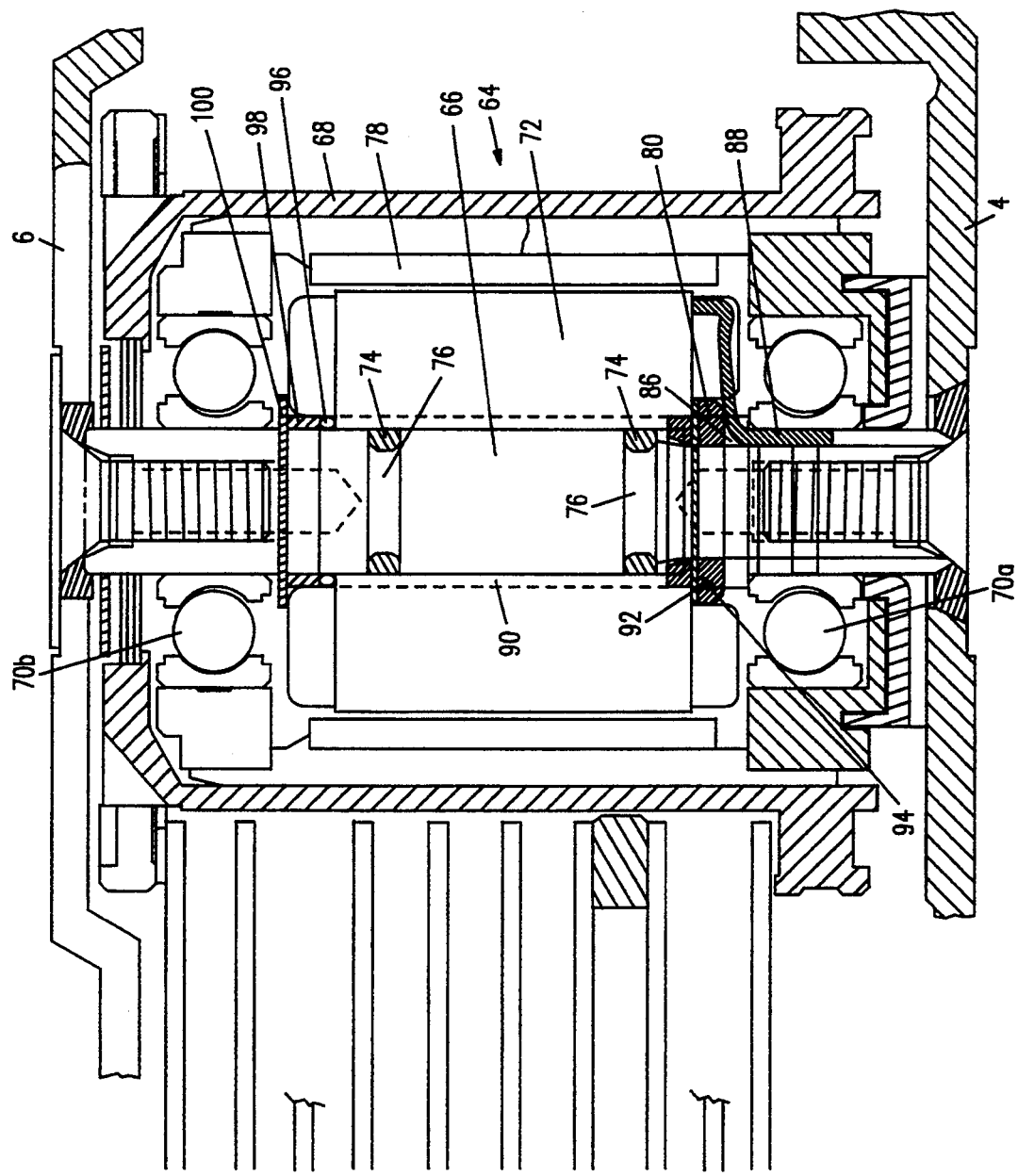
FIG. 4 is a sectional view of a second embodiment of the present invention.

FIG. 4 shows another spindle motor 64 made in accordance with the present invention and used in a different disc drive product. This motor is of a 4-pole, 6-slot configuration and designed to rotate the discs of a 3.5 inch disc drive at a speed of 7200 RPM. This configuration and speed meant that the motor commutation signals were switched at 1440 Hz, and it was found that, if the stator were rigidly mounted to the shaft of the motor, this caused a 5760 Hz resonant frequency which was coupled to the disc drive housing resulting in sympathetic vibration in the housing and the generation of unacceptable acoustic noise. The spindle motor 64 of FIG. 4 is of the stationary-shaft type, as opposed to the rotating-shaft configuration of the spindle motor 48 of FIG. 3. The shaft 66 of the motor 64 is fixedly attached to the housing base member 4 of the disc drive and to the top cover 6 using screws (not designated) or other appropriate fasteners. An examination of FIG. 4 reveals that the shaft 66 is connected to a hub 68 through a pair of ball bearings 70a, 70b. The stator 72 of the motor 64 is mounted to the stationary shaft 66 using a pair of O-rings 74 in corresponding annular grooves 76 formed in the shaft 66. The hub 68 mounts a permanent magnet 78 which makes up the rotor of the motor 64. It was found by experimentation that the high relative torque between the stator 72 and the rotor 78 could cause the stator 72 to rotate relative to the fixed shaft 66, causing stress on the stator wires. Therefore, a stator lock ring 80 is included in the design to hold the stator 72 in place relative to the shaft 66.

Figure 5:
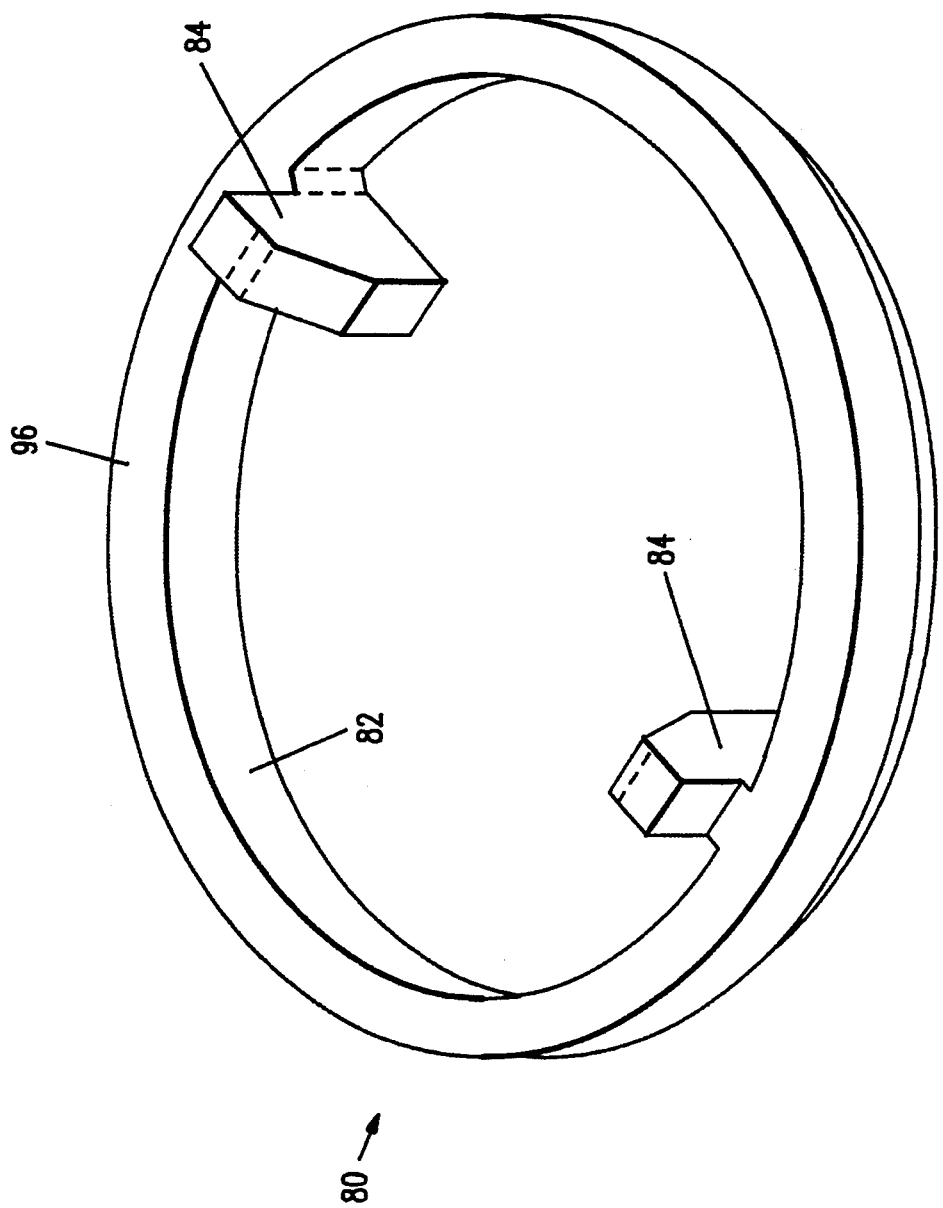
FIG. 5 is an isometric view of a stator lock ring which is used in conjunction with one embodiment of the present invention.

The details of the configuration of the stator lock ring 80 can best be seen in FIG. 5. The stator lock ring 80 is injection molded plastic, such as Ultem 1000 ®, a polyetherimid low viscosity resin thermal plastic product of General Electric Corporation, Plastics Division, of Pittsfield, Me., and has an inner diameter 82 selected to be slightly larger than the outer diameter of the shaft (66 in FIG. 4) and includes a pair of inwardly-extending lock fingers 84 which engage with existing slots (86 in FIG. 4) in the shaft 66 which are also used for the routing of the stator wires (88 in FIG. 4). These lock fingers 84 also extend upward into engagement with alignment slots (90 in FIG. 4) formed in the inner diameter of the stator (72 in FIG. 4).

Returning now to FIG. 4, the stator lock ring 80 is shown in place at the lower end of the shaft 66. The stator lock ring is loosely constrained in the axial direction between the bottom of the stator 72 and the stator wires 88. The amount of movement permitted to the stator lock ring is small enough that the lock fingers 84 will remain in engagement with the slots 86 in the shaft 66 and the alignment slots 90 in the inner diameter of the stator 72. In this manner, circumferential movement of the stator 72 relative to the shaft 66 is prevented, while radial connection between the stator 72 and shaft 66 is made via the compliant O-rings 74.

A second aspect of the invention shown in the embodiment of FIG. 4 lies in the manner in which the stator 72 is axially constrained relative to the shaft 66. It has been found through experimentation that eliminating any metal-to-metal contact between the stator 72 and the stationary shaft 66 in the axial direction further reduces generated acoustic noise by a significant amount. To eliminate such metal-to-metal contact, the stator 72 rests axially on a non-metallic washer 92 which is atop a step 94 in the shaft 66. It has been found that a Mylar ®, a polyester thermal plastic product of E. I. Dupont de Nemours Co., of Wilmington, Del., washer 0.010 inches thick is adequate for this purpose.

Figure 6:
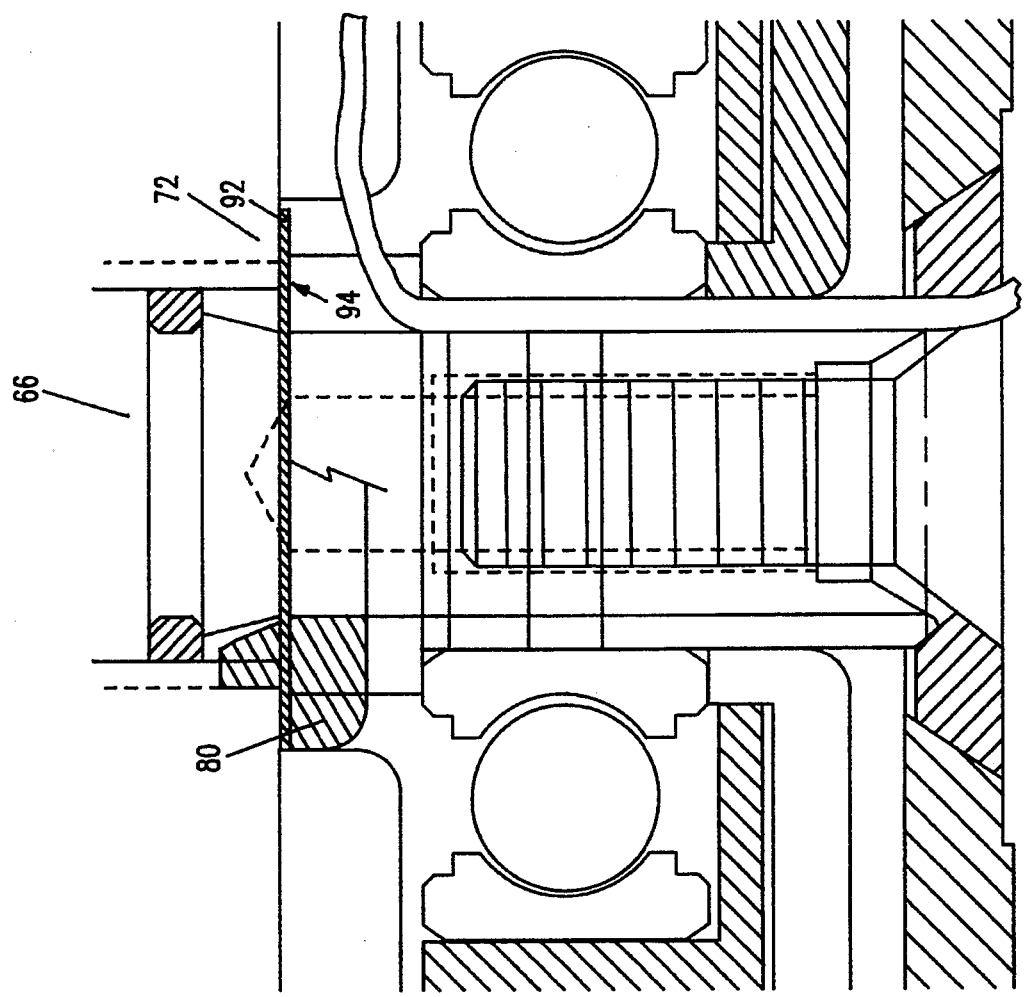
FIG. 6 is a detail view of a portion of the sectional view of FIG. 4.

Details of this washer placement are best seen in the detail view of FIG. 6. FIG. 6 shows the lower end of the stator 72 and the associated portion of the shaft 66. That portion of the stator lock ring 80 on the right of the figure has been cut away for clarity. As can be seen in the figure, the step 94 in the shaft 66 extends radially slightly beyond the inner diameter of the stator 72. Located between the inner diameter of the stator and the step 94 is the Mylar ® washer 92. An examination of the figure further shows that the washer 92 extends radially beyond the step 94 to approximately the outer diameter of the stator ring 80.

Returning now to FIG. 4, an axial O-ring 96, also formed of 70 Durometer Viton ®, contacts the top of the stator 72 at its inner diameter. A tubular spacer 98 rests atop the axial O-ring 96 and a circular snap ring 100 is then placed in an annular groove (not designated) to constrain the axial O-ring 98 against the stator 72. The spacer 98 is included only to prevent interference between the snap ring 100 and the stator windings, and could be omitted if the motor configuration allows. Thus axial constraint of the stator stack 72 is made between the axial O-ring 96 and the non-metallic washer 92, eliminating metal-to-metal contact between the shaft 66 and the stator 72 in the axial direction. In this particular motor configuration, the combination of radial O-rings 74, stator lock ring 80, Mylar ® washer 92 and axial O-ring 96 was found to result in a 5 dB acoustic noise reduction. While the actual amount of acoustic noise reduction may vary with specific motor specification and configuration, it is evident that this radial and axial compliance can be expected to provide significant benefit in any particular embodiment of spindle motor.

It was found in this application that 70 durometer Viton ® polymer was a suitable material for the O-rings 74, 96 but other materials may be found that accomplish the same ends without violating the spirit of the invention. Likewise, such variables as the size of the air gap between the stator and the stationary portion of the motor to which the stator is mounted, the amount of radial and/or axial compression applied to the O-rings, and the number of O-rings can all be selected to customize the configuration for specific usage.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims. The scope of the invention is therefore intended to be limited only by the following claims.

What is claimed is:

1. A spindle motor for rotating discs in a disc drive data storage device, the spindle motor including a stationary shaft for attaching the spindle motor to a housing of the disc drive, the spindle motor comprising
   a stator, and
   resilient mounting means interposed between the stator and the stationary shaft of the spindle motor for isolating the stator from the stationary shaft of the spindle motor; said resilient mounting means comprising a plurality of compliant toroidal rings, wherein certain ones of the toroidal rings are interposed radially between the stator and the stationary shaft of the spindle motor and these certain ones of the toroidal rings are axially constrained relative to the stator by a corresponding number of annular grooves formed in the stationary shaft of the motor, and
   wherein at least one of the toroidal rings is interposed axially between the stator and a snap ring seated in an annular groove in the stationary shaft of the spindle motor at a first end of the stator, and a non-metallic washer is interposed between the stator and the stationary shaft of the motor at a second end of the stator, and
   a non-metallic stator lock ring, the stator lock ring having a plurality of locking fingers for engagement with slots in the stator and the stationary shaft of the motor, whereby circumferential movement of the stator relative to the stationary shaft of the motor is prevented.

2. A spindle motor for rotating discs in a disc drive data storage device, the spindle motor including a stationary shaft for attaching the spindle motor to a housing of the disc drive, the spindle motor comprising
   a stator;
   resilient mounting means interposed between the stator and the stationary shaft of the spindle motor for isolating the stator from the stationary shaft of the spindle motor; and
   a non-metallic stator lock ring, the stator lock ring having a plurality of locking fingers for engagement with slots in the stator and the stationary shaft of the motor, whereby circumferential movement of the stator relative to the stationary shaft of the motor is prevented.

3. A disc drive data storage device, including a spindle motor for rotating discs in the disc drive data storage device, the spindle motor including a stationary shaft for attaching the spindle motor to a housing of the disc drive data storage device, the spindle motor comprising
   a stator;
   resilient mounting means interposed between the stator and the stationary shaft of the spindle motor for isolating the stator from the stationary shaft of the spindle motor; and
   a non-metallic stator lock ring, the stator lock ring having a plurality of locking fingers for engagement with slots in the stator and the stationary shaft of the motor, whereby circumferential movement of the stator relative to the stationary shaft of the motor is prevented.

* * * * *